United States Patent Office 3,155,707
Patented Nov. 3, 1964

---

3,155,707
SYMMETRICAL DIARYL DIAMIDODITHIOPYRO-PHOSPHATES
Kenneth C. Kauer, Midland, Mich., assignor to The Dow Chemical Company, Midland, Mich., a corporation of Delaware
No Drawing. Filed Aug. 2, 1961, Ser. No. 128,690
7 Claims. (Cl. 260—461)

The present invention is directed to the symmetrical diaryl diamidodithiopyrophosphates corresponding to the formula

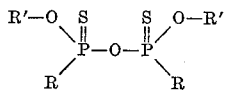

In this and succeeding formulae, R represents lower alkylamino; and R' represents lower alkylphenyl, lower alkoxyphenyl, lower alkylthiophenyl, lower alkyl-halophenyl, lower alkoxyhalophenyl, lower alkylthio-halophenyl or halophenyl. In the present specification and claims, the expressions "lower alkyl," "lower alkoxy" and "lower alkylthio" are employed to refer to radicals containing from 1 to 5 carbon atoms, inclusive. These novel compounds are liquid or crystalline solid materials which are somewhat soluble in many common organic solvents and of low solubility in water. The compounds are useful as herbicides and parasiticides and are adapted to be employed as active toxic constituents of compositions for the control of many plant, mite, insect and bacterial and fungal organisms such as aphids, ticks, worms, flies, roaches, beetles, nematodes, ascarids and pigweed.

The new compounds are prepared by reacting together water, a tertiary amine and an O-aryl phosphoramidochloridothioate corresponding to the formula

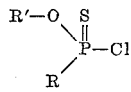

The reaction takes place readily at the temperature range of from 10° to 50° C. with the production of the desired product and chloride of reaction. This chloride appears in the reaction mixture as the hydrogen chloride salt of the tertiary amine, such as pyridine hydrochloride or triethylamine hydrochloride. The amounts of the reactants to be employed are not critical, some of the desired product being obtained when employing any proportion of the reagents. Good results are obtained when employing about two molecular proportions of each of the phosphoramidochloridothioate and tertiary amine and about one molecular proportion of water. In the preferred method of operation, optimum yields are obtained when employing a small excess of water. In carrying out the reaction, the reactants are mixed and contacted together in any convenient fashion and maintained for a period of time in the contacting temperature range to insure completion of the reaction. Following the reaction, the desired product is separated by conventional operations. In a convenient method of isolation, the reaction mixture is extracted with a solvent such as methylene chloride, the solvent extract washed with water and the solvent thereafter removed from the washed mixture to obtain the desired product as a residue.

The following examples merely illustrate the invention and are not to be construed as limiting.

EXAMPLE 1

*Symmetrical O,O-Bis(2,4-Dichlorophenyl) N,N'-Dimethyl Diamidodithiopyrophosphate*

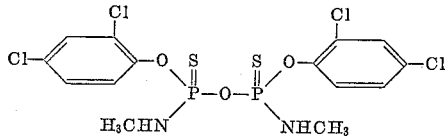

O-(2-4-dichlorophenyl) N-methyl phosphoramidochloridothioate (145 grams; 0.5 mole) was added portionwise with stirring to a mixture consisting of 41 grams (0.52 mole) of pyridine and 4.85 grams (0.27 mole) of water. The addition was carried out over a period of 3 hours and at a temperature of from 25° to 35° C. Following the addition, the reaction mixture solidified. The solidified mixture was then diluted with 200 milliliters of methylene chloride, the diluted mixture washed with water and the methylene chloride thereafter removed from the washed product by evaporation. As a result of these operations, there was obtained a symmetrical O,O-bis(2,4-dichlorophenyl) N,N'-dimethyl diamidodithiopyrophosphate product as a crystalline residue. This product was successively recrystallized from methanol and a mixture of methylene chloride and a petroleum ether boiling at from 60° to 70° C. The recrystallized product melted at 106–108° C. and had phosphorus, chlorine and nitrogen contents of 11.84 percent, 26.94 percent and 5.49 percent, respectively, as compared to theoretical contents of 11.78 percent, 26.98 percent and 5.33 percent.

EXAMPLE 2

*Symmetrical O,O-Bis(4-Chlorophenyl) N,N'-Dimethyl Diamidodithiopyrophosphate*

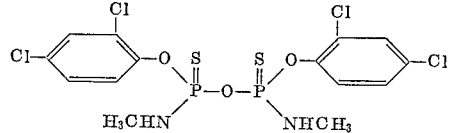

O-(4-chlorophenyl) N-methyl phosphoramidochloridothioate (128 gram; 0.5 mole) was added portionwise with stirring to a mixture consisting of 41 grams (0.5 mole) of pyridine and 4.85 grams (0.27 mole) of water. The addition was carried out over a period of 60 minutes and at a temperature of from 25° to 30° C. Stirring was thereafter continued and the temperature of the reaction mixture maintained at from 30° to 38° C. for 2 hours to insure completion of the reaction. The reaction mixture was then diluted with 100 milliliters of methylene chloride and the diluted mixture washed twice with water. Low boiling constituets were thereafter removed from the washed mixture by fractional distillation under reduced pressure at gradually increasing temperatures up to a temperature of 75° C. at one millimeter pressure to obtain a symmetrical O,O-bis(4-chlorophenyl) N,N'-dimethyl diamidodithiopyro-phosphate product as a liquid residue.

This product had a density of 1.4060 at 25° C. and a refractive index n/D of 1.5969 at 25° C.

EXAMPLE 3

*Symmetrical O,O-Bis(4-Tertiarybutyl-2-Chlorophenyl) N,N'-Diisopropyl Diamidodithiopyrophosphate*

A mixture consisting of 27.7 grams (0.35 mole) of pyridine and 3.2 grams (0.177 mole) of water was added portionwise with stirring to 113 grams (0.33 mole) of O-(4-tertiarybutyl-2-chlorophenyl) N-isopropyl phosphoramidochloridothioate. The addition was carried out over a period of 15 minutes and at a temperature of from 15° to 25° C. Stirring was thereafter continued and the temperature of the reaction mixture maintained at 35° to 43° C. for 6 hours to insure completion of the reaction. The reaction mixture was then diluted with 100 milliliters of methylene chloride, the diluted mixture washed with water and low boiling constituents removed from the washed mixture as previously described by vacuum distillation up to a temperature of 60° C. at 10 millimeters pressure. The residue was thereafter successively recrystallized from a petroleum ether boiling at from 60° to 70° C. to obtain a symmetrical O,O-bis(4-tertiarybutyl-2-chlorophenyl) N,N'-diisopropyl diamidodithiopyrophosphate product as a crystalline solid melting at 78° to 80° C. and having a chlorine content of 11.4 percent as compared to a theoretical content of 11.35 percent.

In similar operations, other products of the present invention are prepared as follows:

Symmetrical O,O-bis(methoxyphenyl) N-tetramethyl diamidodithiopyrophosphate (molecular weight of 470; phosphorus content of 13 percent) by reacting together O-(3-methoxyphenyl) N-dimethyl phosphoramidochloridothioate, triethylamine and water.

Symmetrical O,O-bis(4-methylthiophenyl) N,N'-dimethyl diamidodithiopyrophosphate (molecular weight of 477; sulfur content of 26 percent) by reacting together O-(4-methylthiophenyl) N-methyl phosphoramidochloridothioate, pyridine and water.

Symmetrical O,O-bis(4-tertiarybutyl-2-chlorophenyl) N,N'-dimethyl diamidodithiopyrophosphate (phosphorus content of 10.1 percent; chlorine content of 13.9 percent) by reacting together O-(4-tertiarybutyl-2-chlorophenyl) N-methyl phosphoramidochloridothioate, triethylamine and water.

Symmetrical O,O - bis(3 - chloro-4-methylthiophenyl) N,N' - diethyl diamidodithiopyrophosphate (molecular weight of 574; chlorine content of 12.1 percent) by reacting together O-(3-chloro-4-methylthiophenyl) N-ethyl phosphoramidochloridothioate, pyridine and water.

Symmetrical O,O-bis(4-chloro-2-methoxyphenyl) N,N'-dibutyl diamidodithiopyrophosphate (molecular weight of 600; phosphorus content of 10.0 percent) by reacting together O-(4-chloro-2-methoxyphenyl) N-butyl phosphoramidochloridothioate, pyridine and water.

Symmetrical O,O - bis(4-tertiarybutyl-2-chlorophenyl) N,N'-diethyl diamidodithiopyrophosphate (phosphorus content of 9.8 percent; sulfur content of 9.4 percent; chlorine content of 13.6 percent) by reacting together O-(4-tertiarybutyl - 2 - chlorophenyl) N-ethyl phosphoramidochloridothioate, pyridine and water.

Symmetrical O,O-bis(2,4-dimethoxyphenyl) N-tetraethyl diamidodithiopyrophosphate (molecular weight of 588; sulfur content of 10.4 percent) by reacting together O-(2,4-dimethoxyphenyl) N-diethyl phosphoramidochloridothioate, pyridine and water.

Symmetrical O,O-bis(4-bromophenyl) N,N'-dipropyl diamidodithiopyrophosphate (molecular weight of 399; bromine content of 40.0 percent) by reacting together O-(4-bromophenyl) N-propyl phosphoramidochloridothioate, pyridine and water.

Symmetrical O,O - bis(4-tertiarybutyl-2-chlorophenyl) N-tetramethyl diamidodithiopyrophosphate (refractive index n/D of 1.556 at 25° C.; phosphorus content of 9.7 percent) by reacting together O-(4-tertiarybutyl-2-chlorophenyl) N-dimethyl phosphoramidochloridothioate, pyridine and water.

Symmetrical O,O-bis(2,4,6-tribromophenyl) N,N'-dimethyl diamidodithiopyrophosphate (molecular weight of 662; bromine content of 70 percent) by reacting together O-(2,4,6-tribromophenyl) N-methyl phosphoramidochloridothioate, triethylamine and water.

Symmetrical O,O-bis(2-methylphenyl) N,N'-diethyl diamidodithiopyrophosphate (molecular weight of 448; sulfur content of 14.2 percent) by reacting together O-(2-methylphenyl) N-ethyl phosphoramidochloridothioate, pyridine and water.

Symmetrical O,O-bis(2,4-dichlorophenyl) N,N'-diethyl diamidodithiopyrophosphate (refractive index n/D of 1.593 at 25° C.; sulfur content of 11.23 percent) by reacting together O-(2,4-dichlorophenyl) N-ethyl phosphoramidochloridothioate, pyridine and water.

Symmetrical O,O-bis(4-bromo-2-methylphenyl) N,N'-dimethyl diamidodithiopyrophosphate (molecular weight of 570; bromine content of 28.0 percent) by reacting together O-(4-bromo-2-methylphenyl) N-methyl phosphoramidochloridothioate, pyridine and water.

Symmetrical O,O-bis(2,4-dichlorophenyl) N,N'-diisopropyl diamidodithiopyrophosphate (density of 1.38 at 25° C.; chlorine content of 24.7 percent) by reacting together O-(2,4-dichlorophenyl) N-isopropyl phosphoramidochloridothioate, pyridine and water.

Symmetrical O,O-bis(4-amylphenyl) N,N'-dimethyl diamidodithiopyrophosphate (molecular weight of 530; phosphorus content of 11.1 percent) by reacting together O-(4-amylphenyl) N-methyl phosphoramidochloridothioate, pyridine and water.

Symmetrical O,O-bis(2,4,5-trichlorophenyl) N,N'-dimethyl diamidodithiopyrophosphate (melting at 125° to 127° C.; chlorine content of 35.7 percent) by reacting together O-(2,4,5-trichlorophenyl) N - methyl phosphoramidochloridothioate, pyridine and water.

Symmetrical O,O-bis(4-propoxyphenyl) N,N'-dimethyl diamidodithiopyrophosphate (molecular weight of 501; phosphorus content of 12.5 percent) by reacting together O-(4-propoxyphenyl) N-methyl phosphoramidochloridothioate, pyridine and water.

Symmetrical O,O-bis(2,4,5-trichlorophenyl) N,N'-disecondarybutyl diamidodithiopyrophosphate (density of 1.405 at 25° C.; chlorine content of 30.9 percent) by reacting together O-(2,4,5-trichlorophenyl) N-secondarybutyl phosphoramidochloridothioate, pyridine and water.

Symmetrical O,O-bis(2-ethylthiophenyl) N,N'-dimethyl diamidodithiopyrophosphate (molecular weight of 502; phosphorus content of 12.0 percent) by reacting together O-(2-ethylthiophenyl) N-methyl phosphoramidochloridothioate, pyridine and water.

The novel compounds of the present invention are useful as herbicides and parasiticides for the control of a number of pests. For such uses, the products are dispersed on an inert finely divided solid such as chalk or talc or a finely divided solid surface active dispersing agent and the resulting products employed as dusts. Such mixtures may also be dispersed in water with or without the aid of a surface active agent and employed as sprays. In other procedures, the products are employed as active constituents in solvent solutions, oil-in-water or water-in-oil emulsions or aqueous dispersions. In representative operations, acetone solutions containing one percent by weight of symmetrical O,O-bis(2,4-dichlorophenyl) N,N'-diisopropyl diamidodithiopyrophosphate give complete kills of ticks.

The O-aryl phosphoramidochloridothioates employed as starting materials in accordance with the teaching of the present invention are prepared in known procedures, wherein two molecular proportions of a lower alkylamine is reacted with one molecular proportion of a suitable O-aryl phosphorodichloridothioate having the formula $$R'OP(S)Cl_2$$

The reaction conveniently is carried out in an organic solvent as reaction medium and takes place smoothly at the temperature range of from 0° to 30° C. with the production of the desired product and chloride of reaction. The chloride appears in the reaction mixture as the hydrochloride salt of the lower alkyl amine reagent. Following the reaction, the desired O-aryl phosphoroamidochloridothioate starting product is separated by conventional procedures. The O-aryl phosphorodichloridothioates employed as above described are prepared in known methods wherein phosphorus thiochloride is reacted with a suitable phenol such as 3,4-dibromophenol, 4-chloro-2-methylthiophenol, 2,4-dimethylphenol, 2,4-dibutylphenol, 2-methoxy-4-butoxyphenol, 4-chloro-2-methylphenol, 4-ethylthiophenol, 2,4,5-tribromophenol, 2,5-dichlorophenol, 4-butylthiophenol, 3-methylthiophenol, 2-methyl-4-amylphenol, 2,4,6-trimethylphenol, 2-ethylthio-4-bromophenol or tetrachlorophenol. Good results are obtained when employing substantially equimolecular proportions of the reagents and when operating at temperatures of from 10° to 60° C. Following the reaction, the desired O-aryl phosphorodichloridothioate product is separated by conventional procedures.

I claim:
1. A compound corresponding to the formula

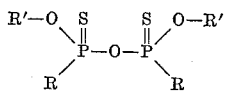

wherein R represents a member of the group consisting of mono-lower alkyl amino and di-lower alkyl amino and R' represents a member of the group consisting of lower alkyl-phenyl, lower alkoxy-phenyl, lower alkylthio-phenyl, lower alkyl-halophenyl, lower alkoxy-halophenyl, lower akylthio-halophenyl and halophenyl.

2. Symmetrical O,O-bis(2,4-dichlorophenyl) N,N'-diethyl diamidodithiopyrophosphate.
3. Symmetrical O,O-bis(2,4,5-trichlorophenyl) N,N'-dimethyl diamidodithiopyrophosphate.
4. Symmetrical O,O-bis(2,4-dichlorophenyl) N,N'-dimethyl diamidodithiopyrophosphate.
5. Symmetrical O,O-bis(4-chlorophenyl) N,N'-dimethyl diamidodithiopyrophosphate.
6. Symmetrical O,O-bis(2-chloro-4-tert.butylphenyl) N,N'-dimethyl diamidodithiopyrophosphate.
7. Symmetrical O,O-bis(2,4-dichlorophenyl) N,N'-diisopropyl diamidodithiopyrophosphate.

References Cited in the file of this patent
UNITED STATES PATENTS
2,654,784    Tolkmith _____ Oct. 6, 1954

OTHER REFERENCES

Cheymol et al.: "Comptes Rendus," vol. 251, No. 11, pp. 1171–1173 (French, Sept. 12, 1960).

British Standard 1831 "Recommended Common Names For Pesticides," pp. 24 and 25 (1959), British Standards Institution, British Standards House, 2 Park St., London, W.1.